(12) United States Patent
Wilmer et al.

(10) Patent No.: US 6,923,568 B2
(45) Date of Patent: Aug. 2, 2005

(54) METHOD AND APPARATUS FOR BLENDING PROCESS MATERIALS

(75) Inventors: Jeffrey Alexander Wilmer, Mesa, AZ (US); Daniel Kase Mackenzie, Scottsdale, AZ (US); John Michael Lull, Claremont, CA (US); Eric A. Zadai, Gilbert, AZ (US); Michael Loren Walker, Phoenix, AZ (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 09/919,772

(22) Filed: Jul. 31, 2001

(65) Prior Publication Data

US 2002/0048213 A1 Apr. 25, 2002

Related U.S. Application Data

(60) Provisional application No. 60/222,124, filed on Jul. 31, 2000.

(51) Int. Cl.$^7$ ............................................. B01F 15/02
(52) U.S. Cl. ............................. 366/152.1; 366/152.2; 366/162.1
(58) Field of Search ............................ 366/336, 150, 366/152.1, 152.4, 152.2, 152.3, 152.5, 152.6, 153.1; 137/3, 4; 73/23.28, 24.05, 32 R, 30.01

(56) References Cited

U.S. PATENT DOCUMENTS

| | | | | |
|---|---|---|---|---|
| 2,964,993 A | * | 12/1960 | Witt | 73/32 R |
| 3,266,780 A | * | 8/1966 | Waters | 366/152.1 |
| 3,779,518 A | * | 12/1973 | Koepke et al. | 366/152.3 |
| 4,059,929 A | | 11/1977 | Bishop | |
| 4,146,422 A | * | 3/1979 | Prough | 73/32 R |
| 4,242,841 A | | 1/1981 | Ushakov et al. | |
| 4,327,759 A | | 5/1982 | Millis | |
| 4,427,298 A | * | 1/1984 | Fahy et al. | 366/132 |
| 4,439,042 A | | 3/1984 | Bertoglio | |
| 4,621,927 A | * | 11/1986 | Hiroi | 366/132 |
| 4,642,222 A | * | 2/1987 | Brazelton | 366/152.2 |
| 4,654,802 A | | 3/1987 | Davis | |
| 4,764,019 A | | 8/1988 | Kaminski et al. | |
| 4,835,456 A | * | 5/1989 | Liu et al. | 73/32 R |
| 4,964,732 A | * | 10/1990 | Cadeo et al. | 366/152.1 |
| 5,271,521 A | | 12/1993 | Noss et al. | |
| 5,332,125 A | | 7/1994 | Schmitkons et al. | |
| 5,372,421 A | | 12/1994 | Pardikes | |
| 5,407,526 A | | 4/1995 | Danielson et al. | |
| 5,423,607 A | * | 6/1995 | Jones et al. | 366/132 |
| 5,478,435 A | | 12/1995 | Murphy et al. | |
| 5,584,959 A | | 12/1996 | Kimura et al. | |

(Continued)

FOREIGN PATENT DOCUMENTS

| | | |
|---|---|---|
| DE | 1962864 | 3/1971 |
| DE | 2320212 | 11/1974 |
| EP | 0 443 324 A1 | 8/1991 |
| JP | 02285635 | 11/1990 |
| JP | 07077597 | 3/1995 |
| TW | 424003 | 3/2001 |
| WO | WO 0014512 | 3/2000 |

*Primary Examiner*—Tony G. Soohoo
(74) *Attorney, Agent, or Firm*—Lowrie, Lando & Anastasi, LLP

(57) ABSTRACT

A method and apparatus for blending and supplying process materials. The method and apparatus are particularly applicable to the blending of ultra-high purity chemicals, the blending of abrasive slurries with other chemicals for the polishing of semiconductor wafers, and high-accuracy blending of chemicals. The apparatus may include a dispensing subsystem that supplies process materials to a mixing subsystem where they are blended with a static mixer. The method may include supplying process materials with a dispensing subsystem and blending the process materials in a static mixer.

9 Claims, 13 Drawing Sheets

U.S. PATENT DOCUMENTS

| | | |
|---|---|---|
| 5,634,715 A | 6/1997 | Stehr et al. |
| 5,641,410 A * | 6/1997 | Peltzer .................... 366/152.4 |
| 5,750,440 A | 5/1998 | Vanell et al. |
| 5,823,219 A * | 10/1998 | Purvis et al. .................. 137/5 |
| 5,993,671 A * | 11/1999 | Peltzer .......................... 137/5 |
| 6,048,256 A | 4/2000 | Obeng et al. |
| 6,050,283 A | 4/2000 | Hoffman et al. |
| 6,105,606 A | 8/2000 | Jackson |
| 6,199,599 B1 | 3/2001 | Gregg et al. |
| 6,217,659 B1 | 4/2001 | Botelho et al. |
| 6,224,778 B1 * | 5/2001 | Peltzer .................... 366/152.1 |
| 6,260,588 B1 | 7/2001 | Noah et al. |
| 6,267,641 B1 | 7/2001 | Vanell et al. |
| 6,276,404 B1 | 8/2001 | Birtcher et al. |
| 2002/0154567 A1 | 10/2002 | Husher |

\* cited by examiner

METHOD AND APPARATUS FOR BLENDING PROCESS MATERIALS

This patent application claims priority to U.S. Provisional Patent Application No. 60/222,124, filed Jul. 31, 2000.

BACKGROUND OF THE INVENTION

1. Field of Invention

The present invention is directed to a method and apparatus for blending process materials and, particularly, to a method and apparatus for blending ultra-high purity chemicals, abrasive slurries and the like.

2. Description of the Related Art

Blended process materials are required, for example, in the pharmaceutical, cosmetic and semiconductor industries. In the semiconductor industry, blended process materials are typically prepared using batch production systems including a dispensing subsystem and a mixing subsystem. The dispensing subsystem transfers materials from a supply source to the mixing subsystem. Supply sources are typically containers designed for safe storage of a process material, such as a chemical or slurry. Other supply sources include facility generation plants, such as deionized (DI) water generation facilities or facilities for supplying other mass-consumed process materials, such as hydrogen peroxide or ammonium hydroxide. The facility generation plant may be directly connected to the dispensing subsystem. A single dispensing subsystem may connect to a variety of supply sources, transferring process material from each to the mixing subsystem.

In the mixing subsystem, the process materials transferred by the dispensing subsystem are added to a mixing vessel or tank. Typically, the materials are added in a predetermined sequence, as required for a particular process. For example, the process may require a predetermined ratio of individual process materials to create a desired blend. The sequence of the process may be based on reactivity or safety, for example an acidic or basic solution is typically added after water. Alternatively, the sequence of the process may be based on the need to reduce or correct process variances, such as dilution of an excessively concentrated wafer polish slurry with DI water. In some cases, it may be necessary to interrupt the addition of a first process material to add a second process material, followed by resumption of addition of the first process material.

The addition of process materials to the mixing vessel is typically monitored and regulated by measuring mass or volume differences. Typical mass difference regulated additions may involve the use of a scale on a holding vessel or tank. In this type of system, each process material is added individually, as an automated control system measuring the mass of the holding vessel is not able to discern the relative amounts of two process materials added simultaneously. Typical volume difference regulated additions may involve the use of flow meters.

Once in the mixing vessel, the process materials are typically blended into a homogeneous solution with an impeller, forming a batch of blended process materials. The batch of blended process materials is typically then used for its intended application.

Many conventional processes require precise addition of process materials to produce a batch of blended process materials that is acceptable for its intended application. Accordingly, the measuring instruments that monitor the inputs to the mixing vessel are typically very precise to insure batch-to-batch consistency. In many applications, even minor process variations may lead to significant differences in the batch of blended process materials, potentially rendering it useless for its intended application.

SUMMARY OF THE INVENTION

In one embodiment, the present invention is directed to a blending system, including a first material supply line, a second material supply line, and a static mixer fluidly connected downstream of the first and the second material supply lines. The blending system further comprises a process control system including a first flow control device positioned on at least one of the first and the second material supply lines, a first sensor positioned downstream of the static mixer, and a controller comprising logic code to provide a control signal to the first flow control device based upon a sensor signal provided by the first sensor.

In another embodiment, the present invention is directed to a blending system including a plurality of material supply lines and a static mixer positioned downstream of the plurality of material supply lines and fluidly connected to the plurality of material supply lines. The blending system also includes a process control system including a controller, an input device in communication with the controller to provide an input signal representing a desired blend of process materials, and a first valve connected to one of the plurality of material supply lines and to the controller. The blending system further includes a dispensing subsystem including a holding vessel having an inlet and an outlet, a recirculation line fluidly connected to the inlet and the outlet and a second valve fluidly connected to the recirculation line and to one of the plurality of material supply lines such that material from the recirculation line may be selectively diverted to the material supply line.

In another embodiment, the present invention is directed to a method of supplying blended process materials. The method includes supplying a first process material through a first of material supply line, supplying a second process material through a second of material supply line, and blending the first and the second process materials in a static mixer fluidly connected downstream of the first and the second material supply lines. The method also includes regulating the supply of one of the first and the second process materials with a first valve positioned on one of the first and the second material supply lines based upon a sensor signal provided by a sensor positioned downstream of the static mixer.

In another embodiment, the present invention is directed to a method of supplying blended process materials. The method includes supplying a plurality of process materials through a plurality of material supply lines and blending the plurality of process materials in a static mixer positioned downstream of the plurality of material supply lines. The method also includes regulating the supply of the plurality of process materials with a process control system including a controller, an input device, and a first valve connected to one of the plurality of material supply lines and to the controller. The input device is connected to the controller to provide an input signal representing a desired blend of process materials. The method further includes holding one or more of the plurality of process materials in a holding vessel having an inlet and an outlet, recirculating the one or more of the plurality of process materials in a recirculation line connected to the holding vessel inlet and outlet, and diverting a portion of the one or more of the plurality of process materials into one of the plurality of material supply lines with a second valve connected to the recirculation line and to the one or more of the plurality of material supply lines.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

Figure 1:
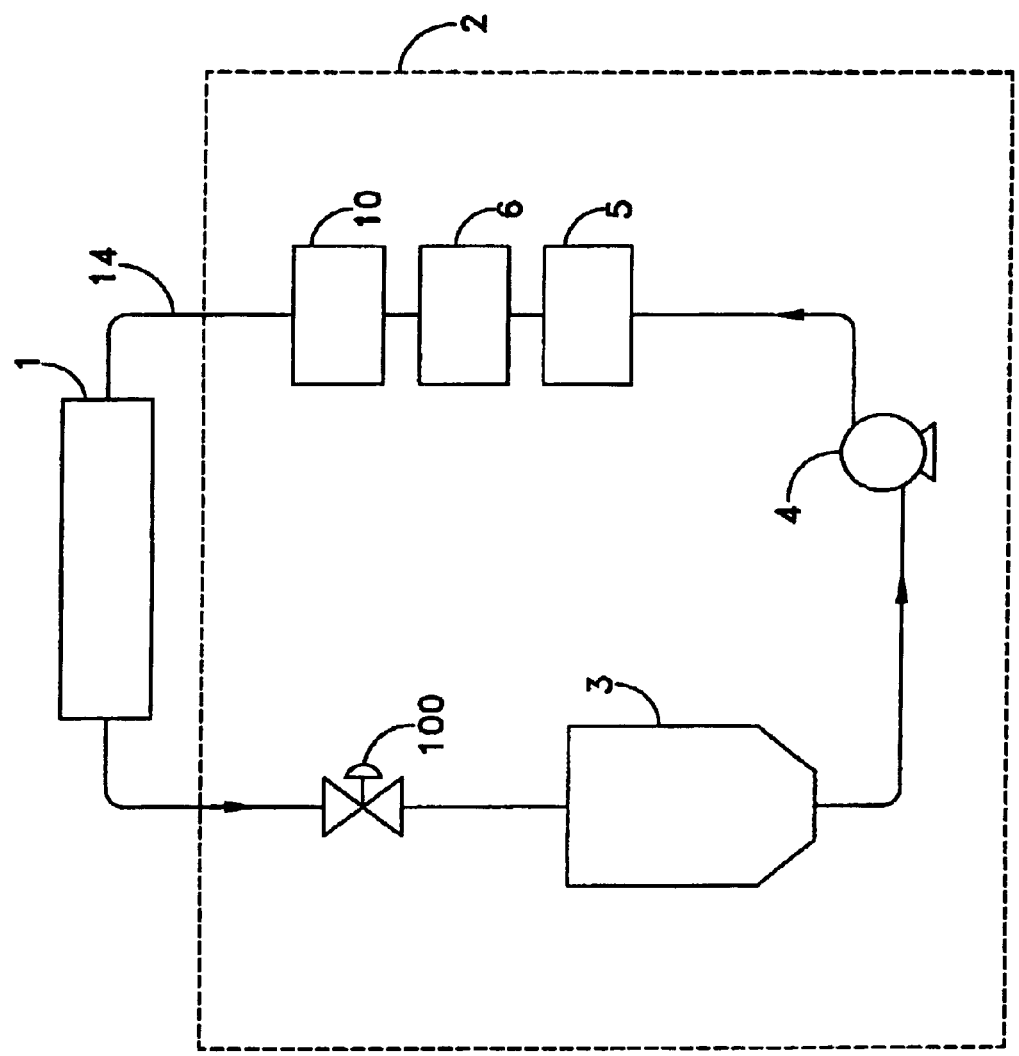
FIG. 1 is a block diagram of one embodiment of the apparatus of the invention.

The present invention is directed to a system for blending process materials. The blending system is suitable for blending and supplying process materials on demand to a point of use or for providing a blend of process materials for later use. By process materials it is meant any fluid material capable of being transported through a conduit. For example, process materials may include water, various chemicals, solutions, suspensions of solids, slurries or any such other materials. While the blending system of the present invention is for use with any process requiring blended process materials, it is particularly applicable to the blending of ultra high purity chemicals and abrasive slurries and other blending applications were accuracy and precision are desired. For example, the present invention is particularly useful in the semiconductor, cosmetic and pharmaceutical industries.

An embodiment of the blending system of the invention includes a plurality of material supply lines, a static mixer positioned downstream of the plurality of material supply lines and a process control system. As used herein, the term "static mixer" refers to any device constructed to encourage the mixing of process materials. The plurality of material supply lines may be any conduits for carrying process materials. For example, material supply lines may be pipes, channels or other devices for directing fluid flow. The plurality of material supply lines may supply many different process materials from a variety of sources. For example, material supply lines may supply process materials from storage containers or from facility generation plants. In some instances, the material supply lines may supply process materials from a dispensing subsystem.

In some embodiments including a dispensing subsystem, the dispensing subsystem may consist of a holding vessel, a recirculation line and a valve. The recirculation line may be fluidly connected to the inlet and the outlet of the holding vessel to provide continuous circulation of process material through the recirculation line. This flow may be provided by a device for inducing fluid flow, such as a pump. The valve in the dispensing subsystem may be connected to the recirculation line and to a material supply line, such that process material may be diverted from the recirculation line to the material supply line.

The static mixer of the blending system of the present invention may be in fluid communication with the plurality of material supply lines. For example, the static mixer may include a plurality of inlets, each connected to one of the plurality of material supply lines. The static mixer may also include a mixing region and an outlet. Process materials may be received from the material supply lines at the inlets of the static mixer and passed to the mixing region. The mixing region may be shaped to cause agitation and mixing of the process materials flowing through it. After mixing, the process materials may pass through the outlet, which may be connected to a point of use or storage vessel. Points of use may be any location where there is demand for a supply of blended process materials. For example, points of use may include process machinery or work stations.

In some embodiments, the process control system of the blending system of the invention may include a controller, an input device and a valve. In other embodiments, the process control system may include a controller, a sensor and a valve. It should be appreciated that valves are discussed herein for controlling flow by way of example only; any flow control device may be substituted for any valve in the invention. By flow control device, it is meant any device that is able to provide a desired level of flow control, such as various types of valves, pumps and other pressure modifying devices.

The controller may be any device capable of receiving information and acting upon the information based upon a series of protocols, such as logic code. For example, the controller may be a microprocessor based device, such as a computer. Where the process control system includes one, the input device may be connected to the controller to provide an input signal representing a desired blend of process materials. The input device may be any device capable of receiving information and relaying it to the controller. For example, the input device may be a potentiometer, key pad or Supervision Control And Data Acquisition (SCADA) node.

The valve or valves of the process control system may be connected to one or more material supply lines and to the controller. For example, a valve may be positioned along a material supply line so as to control flow through or into the material supply line and may be controlled by the controller. Accordingly, the controller may control flow through or into the material supply line with the valve in accordance with a desired blend of process materials supplied at the input device. Alternatively, or additionally, the controller may control flow through or into the material supply line based on a signal provided by the sensor.

Viewing the blending system of the invention as a whole, it will now be clear that embodiments of the blending system are capable of supplying a desired blend of process materials based on a user specified input. This blend of process materials may be supplied on a continuous basis, without interruption. Additionally, the blended process materials may be supplied on an as-needed basis, eliminating the need to store the blended process materials. It will also be recognized that the controller may receive additional input to aid the blending process. For example, the controller may be supplied with information from process appropriate sensors regarding the process materials or process conditions. Such sensors may be located anywhere in the blending system, such as in a dispensing subsystem, on a material supply line, or even downstream of the static mixer. It will also be recognized that the controller may also control other aspects of the blending process. For example, the controller may be connected to devices or systems for modifying the properties of the process materials, and may selectively operate these devices or systems based on input received from sensors regarding the condition of the process materials or from an operator or other outside source.

The present invention is adaptable for use in a wide variety of applications. The embodiment of the invention may vary depending on the application. For example, where monitoring of the process materials is desired, sensors may be used, and these sensors may vary with the process materials. Similarly, the construction of the blending system, such as piping, tubing, and wetted surfaces of instruments and pumps may be adapted to particular process materials. For example, where such process materials may be abrasive or corrosive, such as the polishing slurries and chemicals often employed in the semiconductor industry, these structures may be formed of plastic materials such as fluropolymers.

Figure 4:
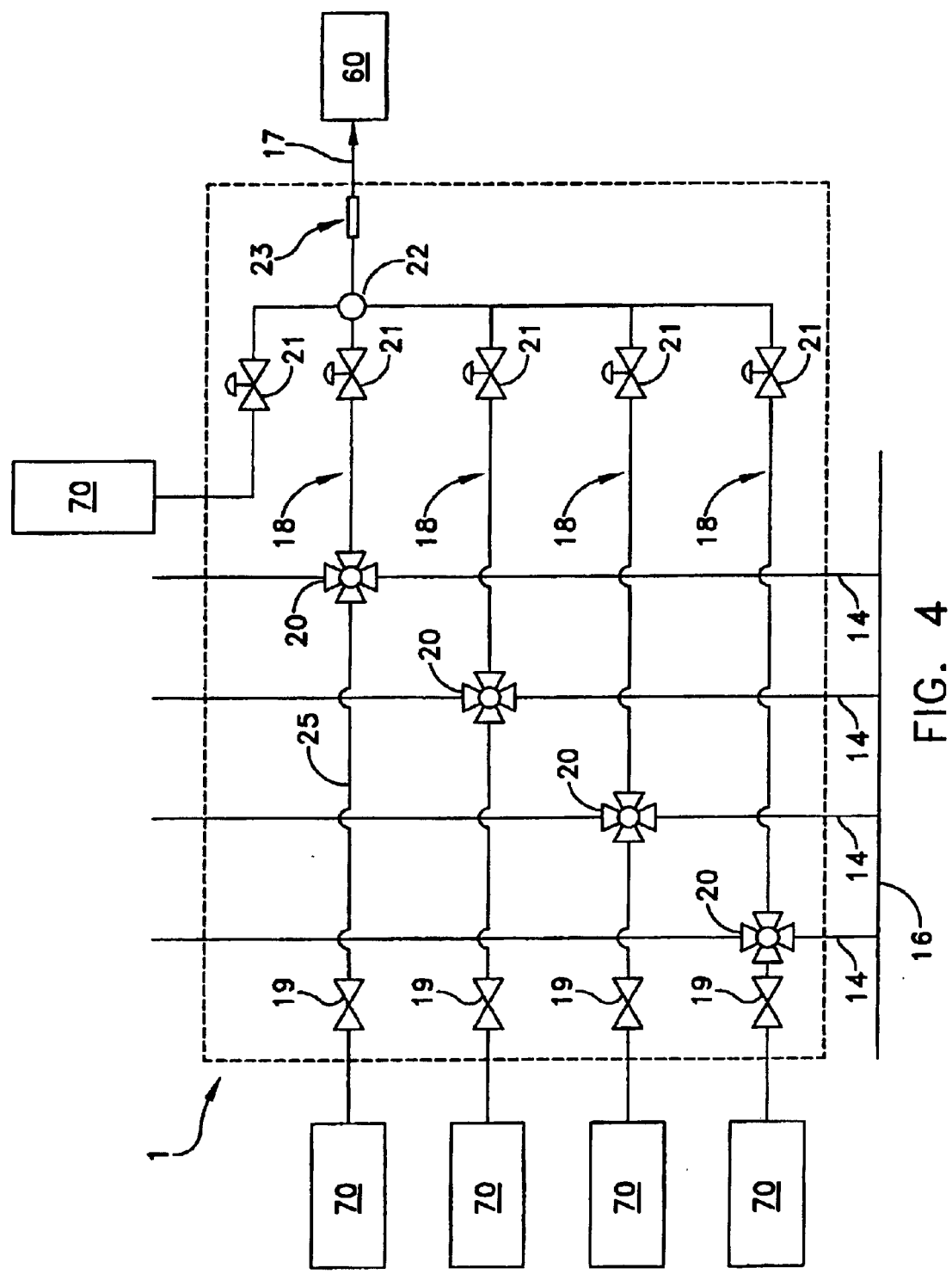
FIG. 4 is a block diagram of another embodiment of the apparatus of the invention.

Referring now to the figures, and in particular to FIG. 1, one illustrative embodiment of the invention is shown. In FIG. 1, a dispensing subsystem 2 is coupled to a mixing subsystem 1. The dispensing subsystem 2 includes equipment to continuously dispense a process material from a holding vessel 3 to mixing subsystem 1, such as a pump 4 and a recirculation line 14. From holding vessel 3, the process material may be pumped by pump 4 through recirculation line 14 to mixing subsystem 1. As illustrated in FIG. 4, which is a block diagram of mixing subsystem 1, recirculation line 14 passes through mixing subsystem 1. In mixing subsystem 1, a valve 20 positioned on recirculation line 14 may connect recirculation line 14 to a material supply line 18. Valve 20 may be actuated to divert process material from recirculation line 14 to material supply line 18 which, in turn, may deliver the process material to a static mixer 22. Process material that is not diverted by valve 20 may remain in recirculation line 14 and may be returned to holding vessel 3.

Holding vessel 3 may be any storage container able to hold sufficient process material to feed a blending process. For convenience, it is preferred that holding vessel 3 be the container that the process material is delivered and/or stored in. For example, holding vessel 3 may be a tank, such as a 55 gallon drum or other common storage vessel. In some embodiments, holding vessel 3 may include an agitator, such as a sparger head or an impeller. An agitator is particularly appropriate where the process materials may settle or separate.

Pump 4 may be any device of any construction that will provide adequate flow of the process material in recirculation line 14. For example, pump 4 may be pneumatically or electrically operated and may be a positive displacement pump, utilizing a bellows or diaphragm construction. Pump 4 may be constructed of materials compatible with the process material being pumped. Examples of suitable pumps include ASTI pumps available from Saint Gobain Performance Plastics of Garden Grove, Calif. and ARO pumps available from Ingersoll-Rand of Woodcliff Lake, N.J.

If process material is diverted from recirculation line 14 to material supply line 18, there may be a loss of pressure in recirculation line 14, despite the continued action of pump 4. Accordingly, a second manner of adjusting pressure may be used. For example, a back pressure valve 100 may be installed in recirculation line 14 and regulated to maintain a desired pressure in recirculation line 14, despite transfer of process material to material supply line 18.

Figure 2:
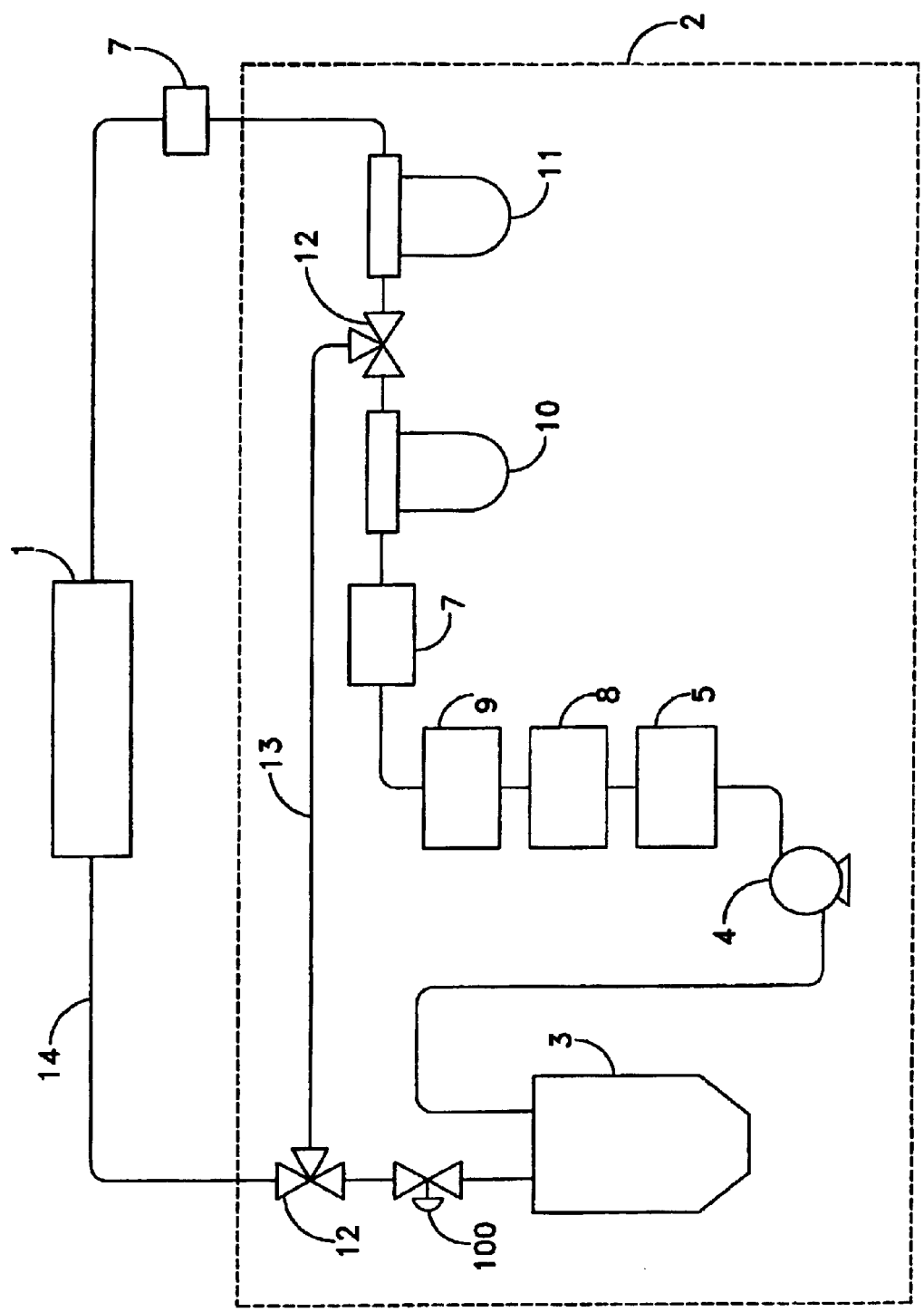
FIG. 2 is a block diagram of another embodiment of the apparatus of the invention.

In order to supply usable process material to mixing subsystem 1, dispensing subsystem 2, may include systems or apparatus for monitoring and/or modifying properties of the process materials in mixing subsystem 1. For example, properties that verify that the process materials are acceptable for blending may be monitored and/or modified. Monitoring or modification systems may include a variety of instruments. Referring now also to FIG. 2, dispensing subsystem 2 may include instruments, such as instruments 5, 6, 7, 8, 9, to monitor the process material in recirculation line 14. The instruments may vary based on the process material supplied to mixing subsystem 1 and the tolerances of the intended application for the blended process materials. For example, instruments for monitoring density, pH, particulates, oxidation and reduction potential, conductivity, index of refraction or other process conditions may be appropriate for a given application. Any instrument that provides the desired feedback may be used. For example, density may be monitored with a densitometer 5, or pH with a pH probe 6.

By way of example, slurries in semiconductor processes will be described. In semiconductor processes, slurries are used as polishing medium in the manufacture of semiconductor wafers. Slurries are also used to polish optical lenses and other disk related items. The polishing effect of slurries results from fine, inert, abrasive particles suspended in a liquid. Typical abrasives in slurries used in the semiconductor industry are silica, alumina and ceria. Abrasives for slurries are manufactured and sorted into particle size ranges. Typical slurries include particles in a range from 0.05 micron to 0.30 micron in diameter and contain greater than $10^{12}$ particles per cubic centimeter.

For monitoring a slurry in a semiconductor process, an instrument for continuously measuring mass density (herein after all densities refer to mass density unless specifically indicated otherwise), such as densitometer 5, may be preferred. Measuring density is one manner of tracking concentration. For example, in slurries, the density is related to the amount of inert, non-volatile solids per unit volume. Accordingly, by measuring volumetric flow rate per unit time, for example with a flow meter, and density, the amount of inert solids delivered to a blend of process materials may be monitored. Monitoring density may also be a preferred for a slurry in a semiconductor process because density measuring instruments may produce less agglomeration than other instruments providing similar feedback because they may not introduce the same shear stresses in the slurry. A sufficiently accurate mass flow meter that does not produce unacceptable agglomeration or a percent solids sensor also may be used for this purpose.

In slurry processes, an instrument for measuring pH, such as a pH sensor, also may be used. If the pH of the slurry is higher than acceptable, the slurry may be too aggressive and may remove unintended materials from the wafer. Conversely, if the pH is too low, intended materials may not be removed.

By way of another example, chemicals used in semiconductor processes will be described. In semiconductor processes, various chemicals are used as reactants and oxidizers for wafer polishing, as well as in scrubbing solutions, post cleaning solutions and developer solutions. These chemicals are typically shipped in raw, concentrate form. Typical chemicals used for polishing include hydrogen peroxide, potassium hydroxide and ammonium hydroxide. Hydrogen peroxide is used as an oxidizer for metal layers on a wafer. Controlling the amount of hydrogen peroxide in a blend of process materials controls the rate material is removed from the wafer surface. Typically, hydrogen peroxide is blended from a 30 weight percent (wt. %) solution to a few percent, such as 2 to 4 wt. %, solution. Potassium hydroxide is used in inter layer dielectric polishing steps for controlling the pH of a blend of process materials to provide desired polishing of silica dioxide layers. Hydrogen peroxide and ammonium hydroxide mixtures are typically used as cleaning and scrubbing solutions. If these mixtures remain unused, the hydrogen peroxide and ammonium hydroxide decompose into water and ammonia. Accordingly, producing these mixtures as they are used according to the present invention is preferred.

For the distribution of bulk chemicals for use in the semiconductor industry, it is preferred that instruments 5, 7, 8, 9 monitor the flow in recirculation line 14 to assure acceptable material is being transmitted. One of the preferred instruments for monitoring acceptability of a chemical process material is an instrument that measures the density of the process material on a continuous basis, such as densitometer 5. Monitoring the density of a chemical process material, as with monitoring the density of a slurry, may make it possible to gauge the concentration of the process material prior to dispensing it to mixing subsystem 1. Alternatively, where density correlates well with temperature, a thermocouple or other temperature probe may replace the densitometer.

Other instruments that may be useful for the measurement and monitoring of a chemical process material, and are preferred for such processes in the semiconductor industry, are instruments for determining concentration and reactivity, such as conductivity sensors 9 and oxidation and reduction potential (ORP) sensors 8, respectively. Conductivity may be used to measure chemical concentration by correlating the two. For many common process materials, tables exist relating conductivity to concentration. Accordingly, by monitoring the conductivity of the process material, it may be possible to monitor its concentration. Monitoring the ORP of the process material may allow detection of sudden changes in chemical reactivity. ORP sensors 8 operate similarly to pH probes 6, however, ORP sensors 8 may measure the properties of liquids, such as hydrofluoric acid, that may deteriorate typical pH probes. Refractive index sensors may also be useful in determining concentration as the refractive index of the material also may be correlated to the concentration.

Another process material property that is of particular importance in high purity applications, such as the semiconductor industry, is the level of particulates. For example, the manufacturing of wafers requires ultra-high purity process materials. Particulates generated from holding vessel 3, or from the manufacturing of the process material, may contaminate the process material and the product. Strict guidelines for particle sizes and the number of particles of a particular size may be required for a semiconductor process to be economically feasible. Accordingly, for processes that are sensitive to particulates, an instrument for measuring particulate levels in a process material, such as on-line or in-line particle counter 7, may be used. Particle counters 7 may find utility both within dispensing subsystem 2 and between dispensing subsystem 2 and mixing subsystem 1, where they may verify that process material from dispensing subsystem 1 has an acceptably low particle level. Particle counters 7 may also be used to verify that a blend of process materials from the static mixer has an acceptably low particle level.

An in-line particle counter 7 typically includes a flow cell mounted directly in a process line, such as recirculation line 14. In-line particle counter 7 monitors particles passing through the flow cell. In-line particle counter 7 typically measures particles per volume and, if the volumetric flow rate varies, the reported particle count may vary. Accordingly, the rate at which material travels through particle counter 7 may be regulated to deliver an accurate particle count. For example, for accurate in-line particle counting, a measurement cell may be connected to a junction of a process line. The junction may divert a stream of fluid through the measurement cell and allow the flow rate through counter 7 to be adjusted to a desired level. Typically, the flow rate through counter 7 is adjusted to about 100 milliliters per minute (ml/min).

Because it is generally mounted directly in a process line, an in-line particle counter 7 typically may only monitor the particle level in that process line. Alternatively, the in-line particle counter 7 may be connected to multiple process lines by a switching mechanism and process material from any of these lines may be redirected to particle counter 7 for monitoring. However, if the flow rates from the multiple process lines are not identical, readings from particle counter 7 for each of the process lines will not be in the same volume scale.

In an on-line particle counter 7, particle counter 7 need not be on a process line. Instead, samples from various process lines may be routed through a system for handling multiple streams, such as manifold, and to counter 7. The samples may be pulled into a sample collector, such as a small, closed loop, insuring that the volume of each sample is the same. Because the volume of each sample is the same, the particle readings for each process line may be in the same volume scale and may be compared. Accordingly, an on-line particle counter 7 allows more process lines, or points in a process line, to be easily monitored and compared.

A process control system for controlling dispensing subsystem 2 and/or mixing subsystem 1 may operate based on the process and on the process material properties. For example, information gathered from instruments may be fed to a controller associated with a process control system connected to valve 20 and/or may be presented to an operator who may identify and correct problems. Presentation to an operator may occur in any form that will get the attention of the operator as desired, such as an output monitor or an alarm. Where the controller is connected to valve 20, the amount of process material that is diverted from recirculation line 14 to material supply line 18 may be selected by the controller based on the process for a given blend of process materials. Accordingly, the controller may be capable of modifying a blend of process materials by altering the flow rate through valve 20, or it may be able to correct for deviations in the process material being diverted from recirculation line 14. For example, if pH sensor 6 detects that the pH of a process material being used to acidify a blend of process materials has risen (a deviation), the controller may receive a signal alerting it to this fact and may divert additional process material from recirculation line 14 to material supply line 18 so that the pH of the blended process materials remains constant. Alternatively, if a change in flow rate will not correct the detected deviation, the process may be halted and the material held within distribution subsystem 2 until appropriate correction may be made.

Where adjusting the flow rate of process material from recirculation line 14 to material supply line 18 may be insufficient to correct a deviation, it is preferred that recirculation line 14 have one or more systems or apparatus for correcting the deviation. These systems or apparatus may include treatment devices. For example, where unacceptable particulate levels may be detected in recirculation line 14, it is preferred that one or more particle separators 10, 11 are located along recirculation line 14. Particle separators 10, 11 may be, for example, rough or polish filters.

In the embodiment illustrated in FIG. 2, continuous feedback from an online or inline particle counter 7 may supply information to a controller for monitoring the particle level in recirculation line 14. At start-up, or whenever the particle level has been detected to exceed a pre-set threshold, valves 12 may be actuated by the controller or an operator to bypass recirculation line 14 and to redirect the process material through a bypass line 13. As the process material circulates in bypass line 13, a filter, such as a rough filter 10, may reduce the particle level in the process material. When the particle level falls to within the pre-set threshold, the controller may either actuate valves 12, or alert an operator who may actuate them, ending the bypass and allowing the process materials to pass through recirculation line 14 where they may be diverted to material supply line 18. In applications requiring very low particulate levels, it is preferred that a polish filter 11 also be located along recirculation line 14. The use of a bypass line 13 with rough filter 10 and polish filter 11 on recirculation line 14 is preferred for the distribution of bulk chemicals for use in the semiconductor industry described above. As illustrated in FIG. 1, filter 10, 11 may also be used without bypass line 13 to provide constant particle removal from recirculation line 14. Furthermore, a bypass line may be used in systems designed to modify properties other than particulate levels.

Figure 3:
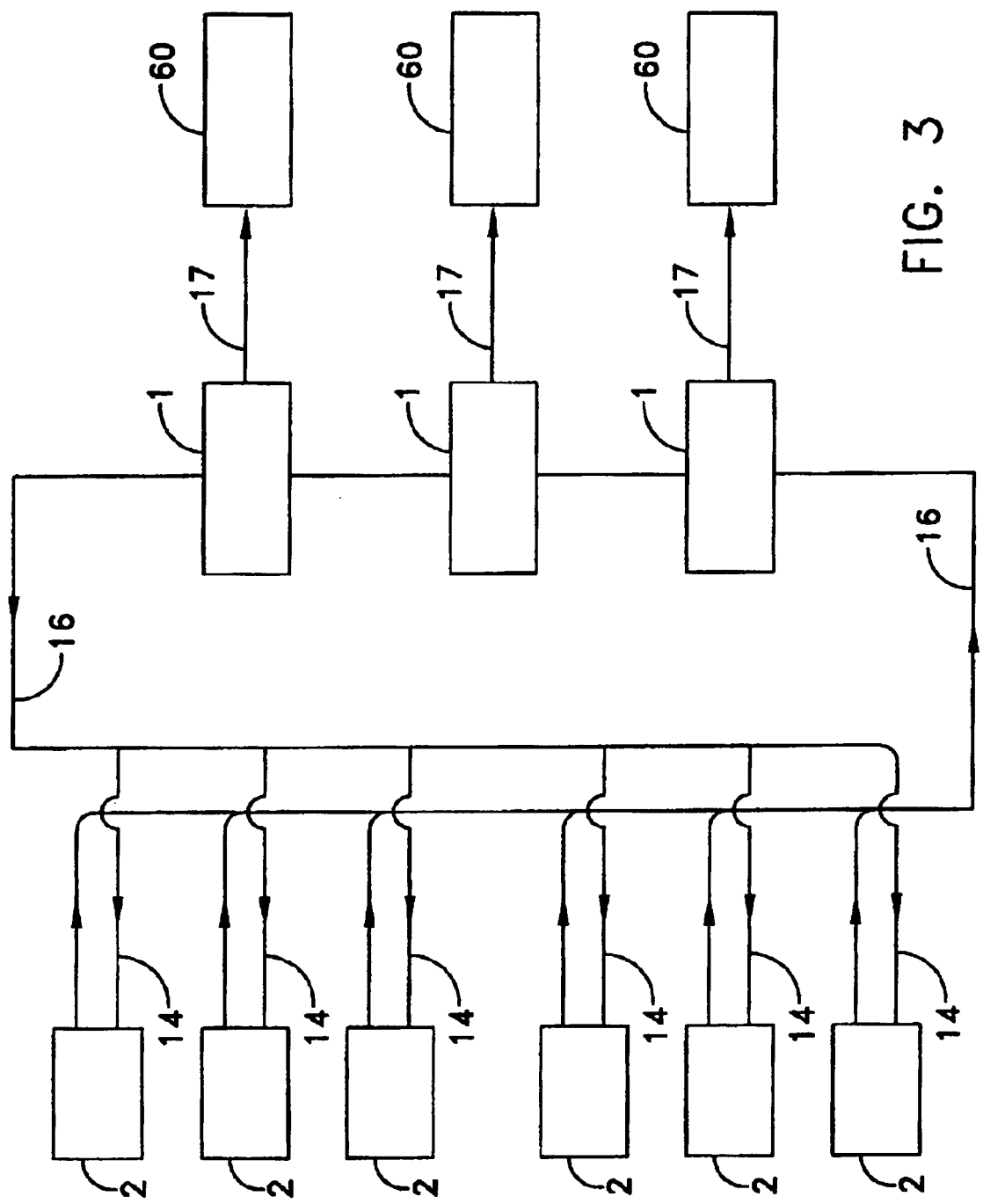
FIG. 3 is a block diagram of another embodiment of the apparatus of the invention.

Referring now to FIG. 3, in a large production facility using many process materials, such as multiple slurries and chemicals in a semiconductor processing facility, many dispensing subsystems 2 may be connected to a line network 16. In line network 16, each process material may be contained in a recirculation line 14. In some embodiments, each recirculation line 14 may be contained in a secondary line structure to prevent leaks and to promote safety where the process materials may be hazardous.

In industries requiring high purity, such as the semiconductor industry, dispensing subsystems 2 are preferably housed in semi-clean rooms, sub-fab, or a particular class clean room. Recirculation lines 14 are preferably run from dispensing subsystem 2 to a clean room environment where mixing subsystem 1 and process equipment 60 are located. Process equipment 60 may be connected to mixing subsystem 1 by an output line 17.

Referring now to FIG. 4, as previously described, each recirculation line 14 may be routed through mixing subsystem 1. Each recirculation line 14 may connect to a material supply line 18 via a valve 20. Also as previously described, valve 20 may allow fluid to flow from recirculation line 14 into material supply line 18 and then to static mixer 22 without diverting all of the process material in the material supply line 18. Multiple valves 20 may be used to allow multiple connections to a single material supply line 18, resulting in limited mixing of process materials in material supply line 18. Valve 20 is preferably a slip stream valve and may operate in any manner, such as pneumatically from an air supply or solenoidally through an electronic actuation device. In processes, such as semiconductor processes, where the process materials may be flammable, valves 20 are preferably energized from a pneumatic source for safety and fire hazard prevention purposes.

In mixing subsystem 1, material supply lines 18 may carry process materials directly from facility generation plants 70. Flow of the process material from facility generation plant 70 into mixing subsystem 1 may be controlled by a valve 19. Other valves 20 may be positioned along material supply line 18 and connected to a recirculation line 14 to allow a second process material to be added to the process material from facility generation plant 70. The combined process materials may then be fed to static mixer 22. For example, water may be delivered from facility generation plant 70 in material supply line 18. A process material from recirculation line 14 may then be added to material supply line 18 at valve 20, resulting in diluted process material in material supply line 18. The diluted process material may pass to static mixer 22. In some embodiments, it may be preferred that material supply lines 18 be kept under constant flow conditions to inhibit the build up of contaminants, such as solids and bacteria. Rather than continuously flowing more costly or dangerous process materials through material supply lines 18 in such an embodiment, DI water or another relatively inert material may be run through lines not presently supplying process material. Having material supply lines 18 connected to a source of DI water may also aid in cleaning and maintenance of material supply lines 18.

Flow of process materials to static mixer 22 from material supply lines 18 may be regulated with a valve 21. Where process materials are being adding to material supply line 18 containing another material, the flow rates and related pressures in the various lines are preferably controlled to insure that the process materials flow at the desired rate and in the desired direction.

Dispensing subsystem 2 and mixing subsystem 1 may be controlled manually or electronically. Preferably, dispensing subsystem 2 and mixing subsystem 1 are connected to a process control system including a controller (most typically, a central processing unit (CPU) with memory, such as a programmable logic controller (PLC)). An input device may allow a desired blend of process materials to be specified by a user. For example a key pad or computer terminal may be used to specify a given blend of process materials to the controller. The controller may receive signals from process equipment to continuously monitor, for example, incoming process materials, process conditions and the safety of personnel. The controller may interpret the input from the input device and the signals from the process equipment to control dispensing subsystem 2 and mixing subsystem 1 to produce the specified blend of process materials. For example, a Supervision Control And Data Acquisition (SCADA) system may be used to control dispensing subsystem 2 and mixing subsystem 1. Such a controller may store quality control data, information on usage of the system, alarm information or other process information. Furthermore, the controller may facilitate statistical process control by maintaining historical data that may be correlated to process output to determine trends and spot problems. A process control system may be designed so that an operator may be physically removed from the process equipment, particularly where the process or process materials may be dangerous.

A typical process control system includes a plurality of pumps, valves, instruments, and monitoring switches. These components may play multiple roles in the operation of the system. For example, fluid pressure drop across a filter may be monitored to determine if the filter needs to be cleaned or replaced. The same pressure measurement devices that monitor the pressure drop across the filter may also provide data on the absolute pressure in the process line.

Process control systems may display the process graphically on a monitor, allowing observation of key features of the process. This graphical display may allow an operator to view all subsystems and process diagrams on an overview screen. In general, each piece of process equipment may be described graphically in an overall schematic displaying all connections, endpoints, and subsystems. From the overview screen, each subsystem may be selected and a separate screen opened displaying the features of that subsystem.

The process control system may also provide feedback, such as an alarm, to an operator for maintenance or safety. In the above example of monitoring pressure differential across a filter, if the pressure differential surpasses a certain set point, an alarm may notify an operator, for example on the graphical display, to clean or change the filter. If the condition causing the alarm is not alleviated within a set period of time, a critical alarm may be activated, which may result in additional notification of the alarm condition or automatic action on the part of the process control system, such as shut down of the process.

Because the flow rate, pressure and other properties, such as concentration or density, of the process material in recirculation line 14 may affect both the flow of process material through valve 20 into material supply line 18 and the amount of process material required, this data may be supplied to the controller. The controller may regulate the speed of pump 4, and other devices in dispensing subsystem 2, to ensure the proper amount of process material passes into material supply line 18. Alternatively, valve 20 may be regulated based on this data to control the flow of process material into material supply line 18.

The flow rate of process material into the material supply line 18 may also be dependant on the flow rate and pressure of any process material, such as water, that is already present in material supply line 18. Accordingly, it is preferred that this data also be supplied to the controller. The controller may adjust valves 19, 20 and/or 21, as well as the flow rate in recirculation line 14 with pump 4, to obtain a desired flow rate and composition in material supply line 18. Because of the amount of data that may be supplied to the controller, and the number of variables that may be controlled based on this data, it is preferred that the controller comprise one or more microprocessors that are able to interpret the data and act on it based on set protocols to produce a desired blend of process materials. However, this function may also be performed by operators or by analog controls.

Mixing subsystem 1 may be controlled according to mass or volume flow rates, or by a combination thereof, depending on the materials involved. Because it is typically more accurate, mass flow rates are preferred. Flow control for process valves 12, 19, 20, 21 may incorporate a flow control valve or variable area orifice valve connected to a flow meter that is operated by a proportional integral differential (PID) system or similar control feedback loop.

In the semiconductor industry, several constituents from dispensing subsystems 2 including, for example, slurries, chemicals, and/or DI water from facility generation plant 70, may go into a given blend of process materials. The components of the blend may be specified through a user interface that may be a SCADA node. Typical processes call for an abrasive slurry to be diluted with DI water for inter layer dielectric polishing steps. Other typical processes call for an abrasive slurry, oxidizer, and DI water for polishing of metal layers. These processes may call for a variety of abrasives, oxidizing chemicals, dilutants, and amounts thereof depending an the process and may change frequently.

In such a semiconductor process system, material supply lines 18 may carry DI water from facility generation plant 70 for diluting process materials and for flushing material supply lines 18 and static mixer 22 when necessary. Each material supply line 18 may send DI water through valves 19, 21 to static mixer 22. As mentioned previously, the DI water inputs preferably keep each material supply line 18 under constant flow, avoiding particulates and bacteria formation. When a process includes slurry process material, valve 20 may be actuated to expose water in material supply line 18 to the slurry process material from a recirculation line 14. Valve 19 preferably regulates the flow of DI water to ensure flow from the recirculation line 14 at valve 20 will flow to valve 21. Valve 21 regulates the slurry flow rate to static mixer 22. The flow rate may depend on the amount of slurry required and density of the slurry. Similarly, where a process calls for a chemical process material from a recirculation line 14, valve 20 may be actuated to expose water in material supply line 18 to the chemical process material. The flow rate may depend on the amount of chemical process material required and density, concentration or other properties of the chemical process material.

Figure 5:
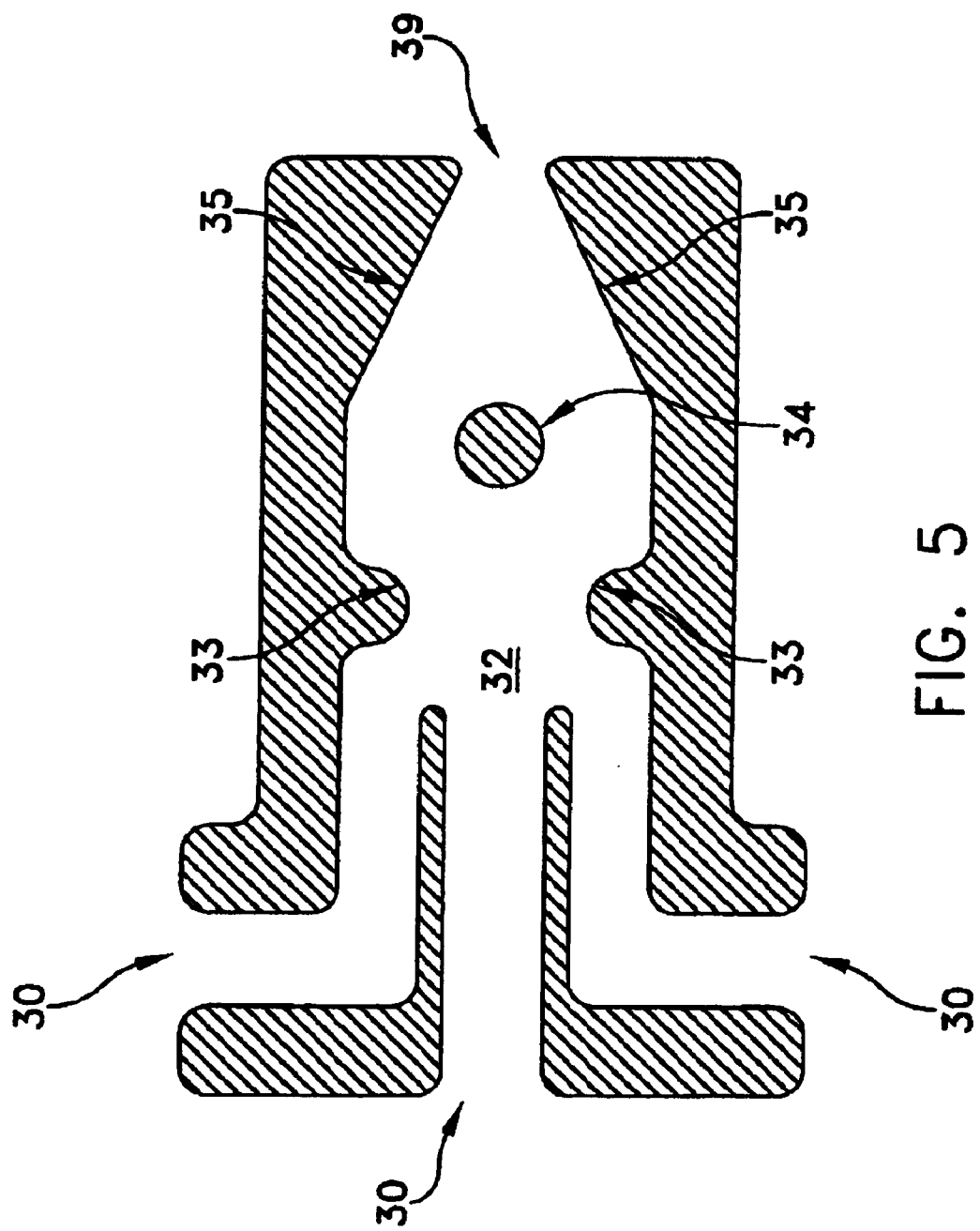
FIG. 5 is a cross-sectional view of one embodiment of the static mixer of the invention.
Figure 6:
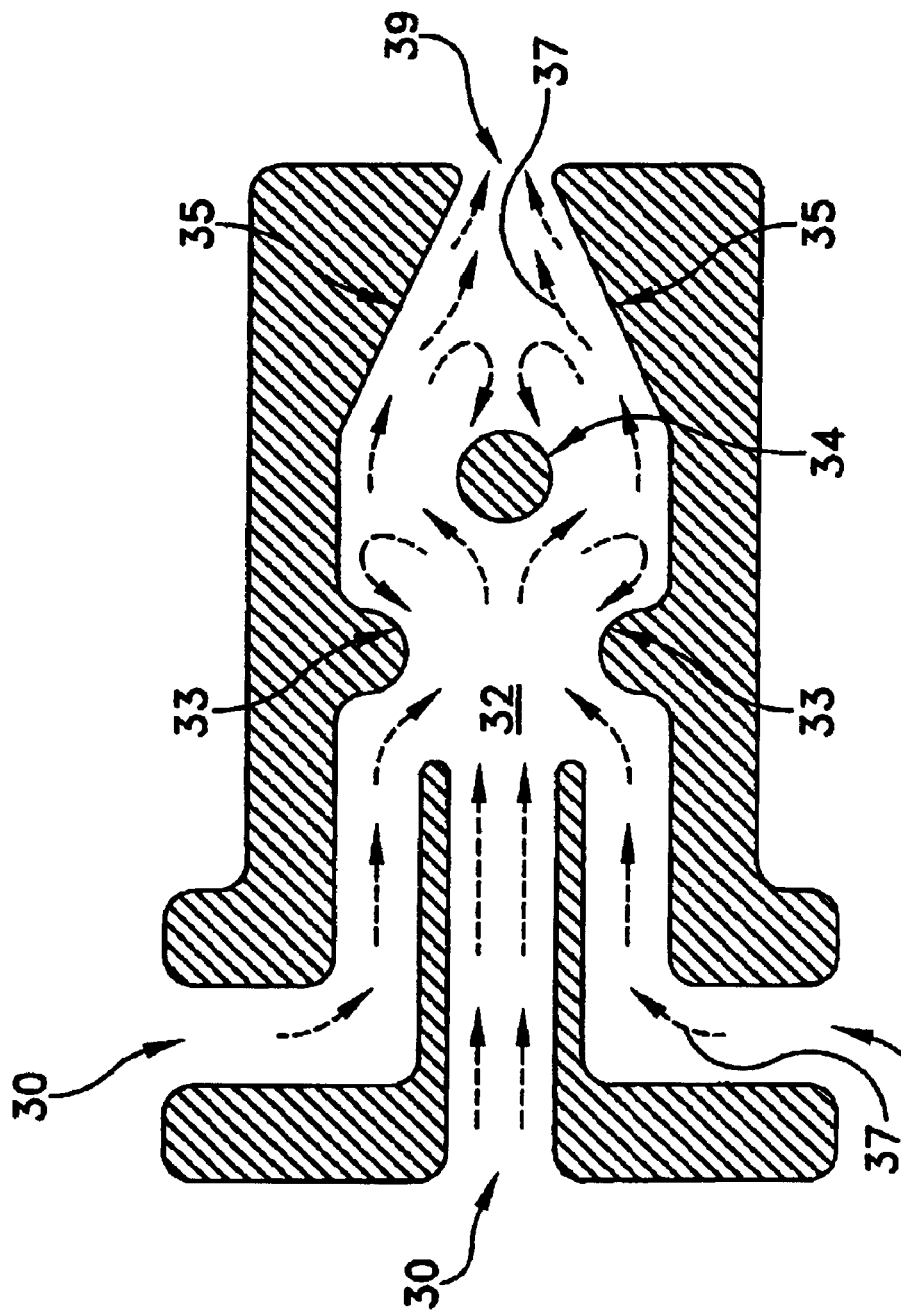
FIG. 6 is a cross-sectional view of the embodiment of the static mixer of the invention illustrated in FIG. 5, with illustrated flow path through the chamber.
Figure 7:
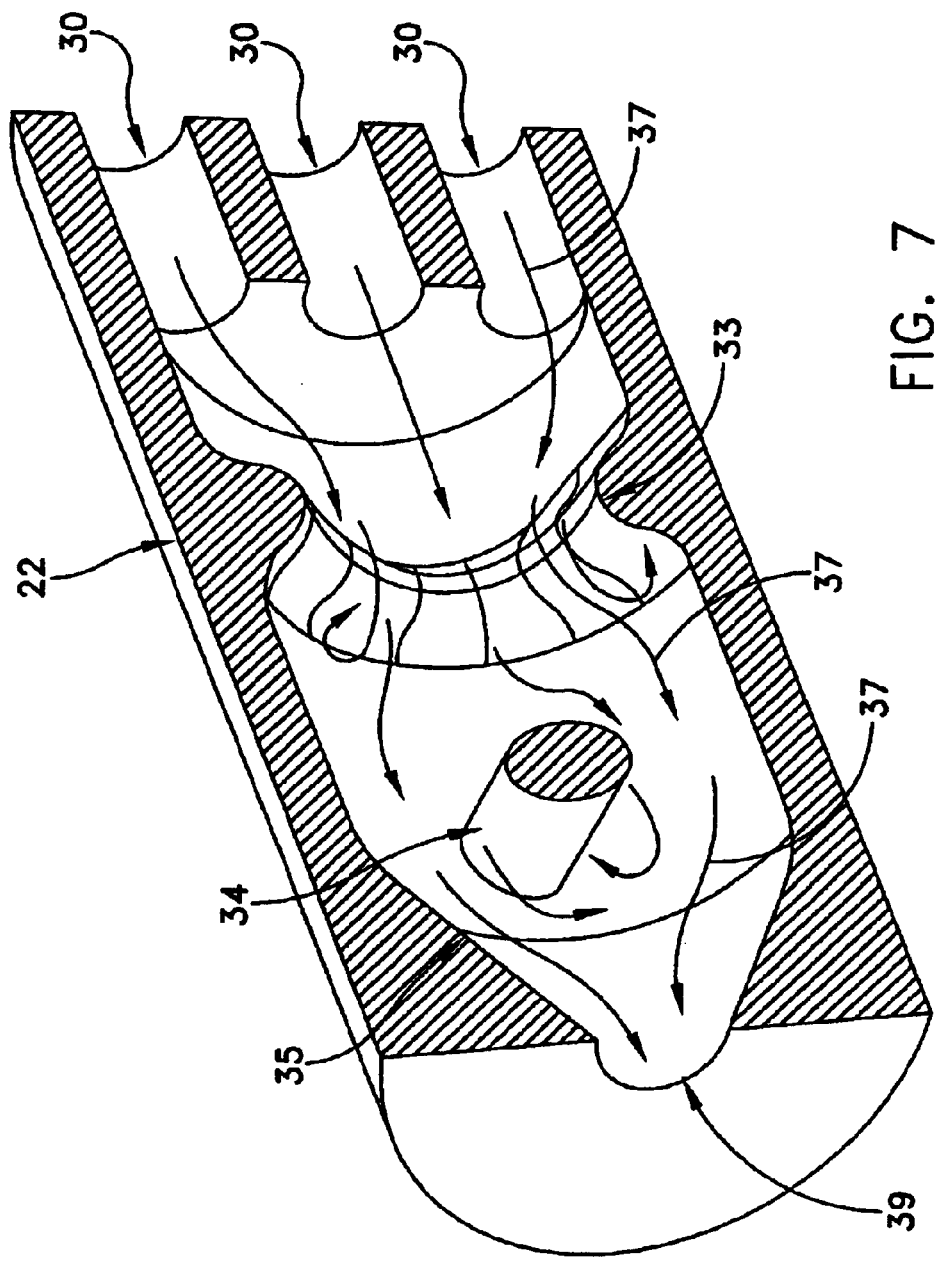
FIG. 7 is a perspective, cross-sectional view of the embodiment of the static mixer of the invention illustrated in FIG. 5, with illustrated flow path through the chamber.

Process materials from material supply lines 18 may continuously pass into static mixer 22 for mixing. The process materials may enter static mixer 22 through any apparatus that allows all of the process materials required for a process to be fed concurrently. Referring to FIGS. 5, 6, and 7, static mixer 22 may include multiple inlets 30 connected to material supply lines 18. Inlets 30 may be connected to material supply lines 18 leading directly from facility generation plants 70, material supply lines 18 leading from recirculation lines 14 or material supply lines 18 that receive inputs from both sources. In the semiconductor industry, material supply lines 18 typically carry slurry process materials, chemical process materials and DI water to static mixer 22.

Static mixer 22 may be constructed in any manner that results in sufficient mixing of the process materials. Preferably, this mixing is accomplished by constructing static mixer 22 such that the process materials are subjected to turbulent flow conditions. For example, static mixer 22 may include one or more baffles or other flow disruption elements. For processes using slurries or other shear sensitive materials, static mixer 22 may be constructed so that mixing is gentle enough to not harm the materials being mixed, yet vigorous enough for thorough mixing. For example, in slurries used for polishing in the semiconductor industry, introduction of high shear rates may create particle growth and may cause significant micro scratching. Accordingly, for these slurries, static mixer 22 is preferably constructed in a manner that will result in relatively gentle mixing. A typical static mixer, such as static mixer including a helical flow disruption element, may be acceptable in some embodiments.

In the embodiment illustrated in FIGS. 5, 6 and 7, static mixer 22 has a single outlet 39 and, after inlets 30, is axially symmetrical about the length of the static mixer. In this embodiment, process materials pass through inlets 30 into a mixing region 32. As the fluids mix and move under pressurized conditions, they travel through a baffle 33, which may be toroidally shaped. Baffle 33 creates a pressure differential and causes eddy formations from turbulence. These eddies are associated with very high Reynolds' numbers that may be necessary for mixing the process materials into a homogeneous solution. After passing through baffle 33, the process materials preferably pass around a flow disruption element 34. Flow disruption element 34 may be cylindrical and may be located along the centerline of static mixer 22. Flow disruption element 34 provides a second stage of agitation. Flow disruption element 34 may create Karmann vortices, which add to the turbulence by eddy generation. Following flow disruption element 34 is preferably a flow constriction region 35. Flow constriction region 35 compresses the process materials as they pass to an outlet 39. Flow constriction region 35 is preferred to be a tapered conical surface because this may decrease back pressure that might otherwise occur if the region decreased in diameter in a stepped fashion.

Figure 8:
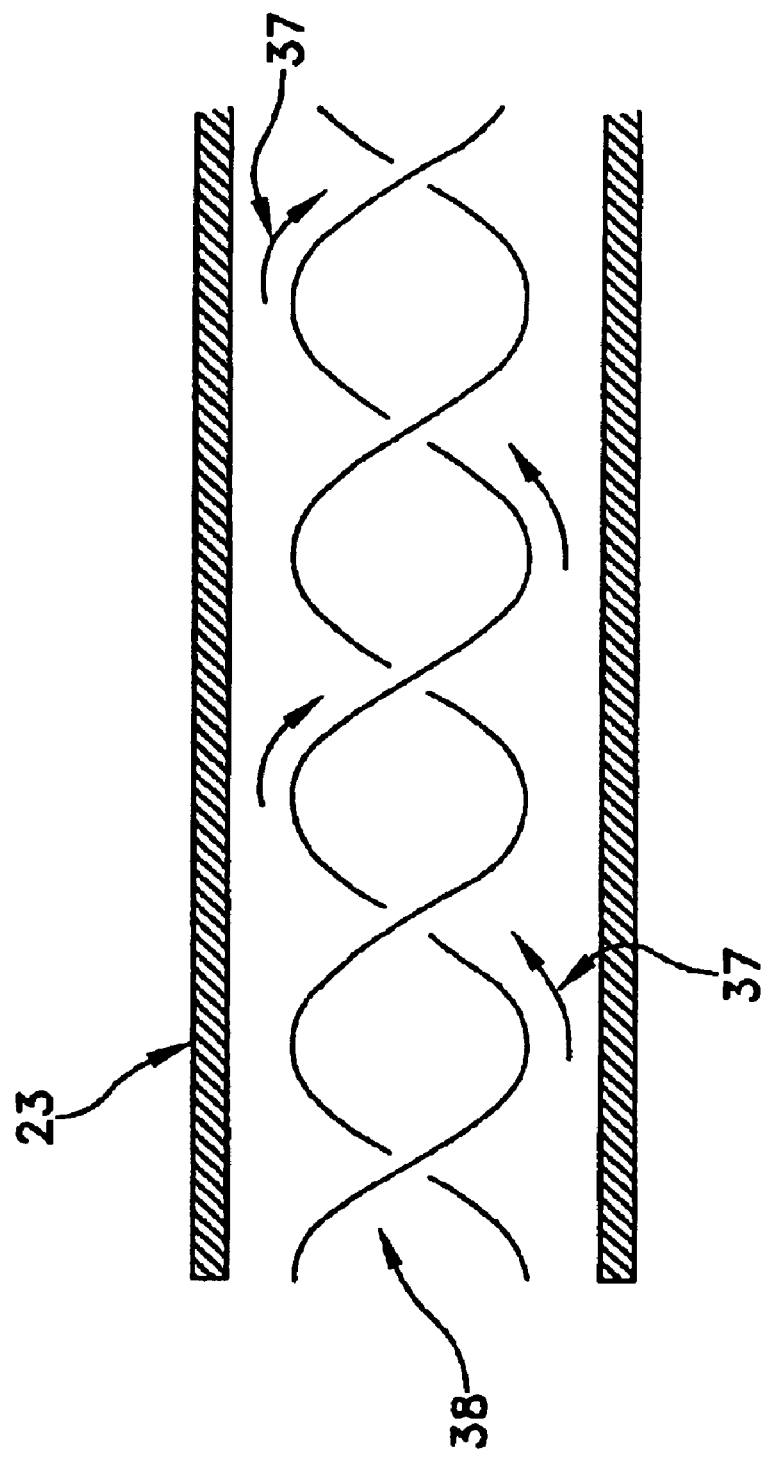
FIG. 8 is a cross-sectional view of one embodiment of the secondary static mixer of the invention, with illustrated flow path through the chamber.

Referring to FIG. 8, the process materials passing through outlet 39 of static mixer 22 may enter a secondary static mixer 23. Secondary static mixer 23 is preferably an in-line static mixer. Secondary static mixer 23 may contain a helical shaped feature 38. The helical shaped feature 38 may be, for example, manufactured from a twisted plastic sheet. Secondary static mixer 23 preferably provides constant agitation of the process materials. For slurry process materials in the semiconductor industry, secondary static mixer 23 is preferably operated at low enough flow rates that the helical path of secondary static mixer 23 will not cause detrimental shear rates, which may create particle growth and may cause significant micro scratching. Though is it highly dependent on the process material and the dimensions and geometry of secondary static mixer 23, a flow rate of about 100–250 ml/min is appropriate for some conditions. It should be understood that a mixer of the type described as secondary static mixer 23 may serve as static mixer 22 and that there need not be any secondary static mixer 23.

Fluid flow diagrams illustrated in FIGS. 6, 7 and 8 generated from basic fluid flow principles show, with flow lines 37, sufficient agitation throughout static mixer 22 and secondary static mixer 23 to ensure thorough mixing of process materials.

In one embodiment, blended process material may pass from static mixer 22 or secondary static mixer 23 through outlet line 17 to a point of use, such as process equipment 60. The point of use may be any machine, equipment, station or other location where a stream of blended of process materials is desired. The outlet line 17 may feed directly to process equipment 60 or to an outlet for use by an operator. For process materials that have a limited life span or may otherwise lose value during transport through outlet line 17, static mixer 22 or secondary static mixer 23 may be located close to the point of use to minimize this loss.

Figure 9:
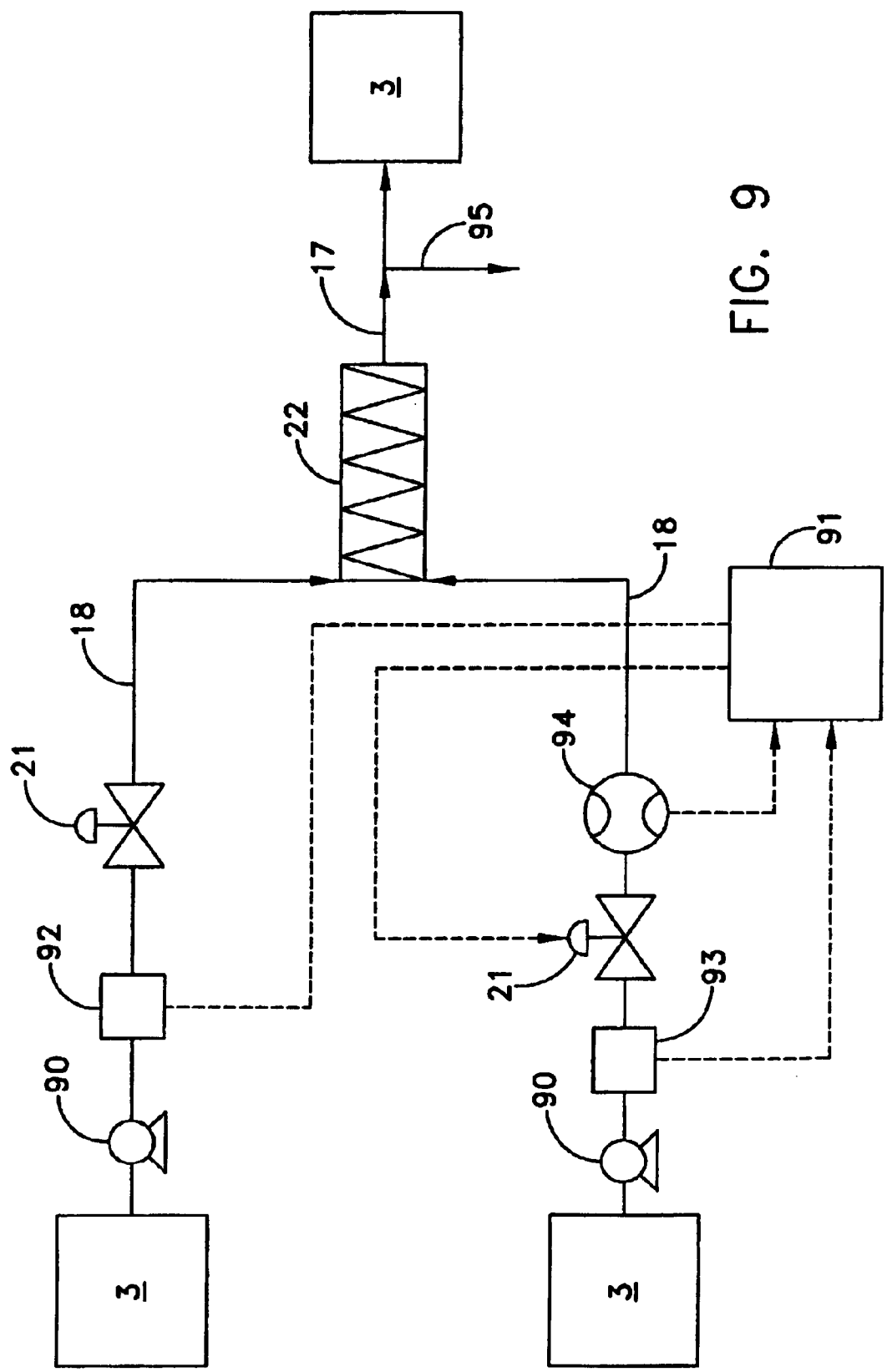
FIG. 9 is a block diagram of another embodiment of the apparatus of the invention.
Figure 10:
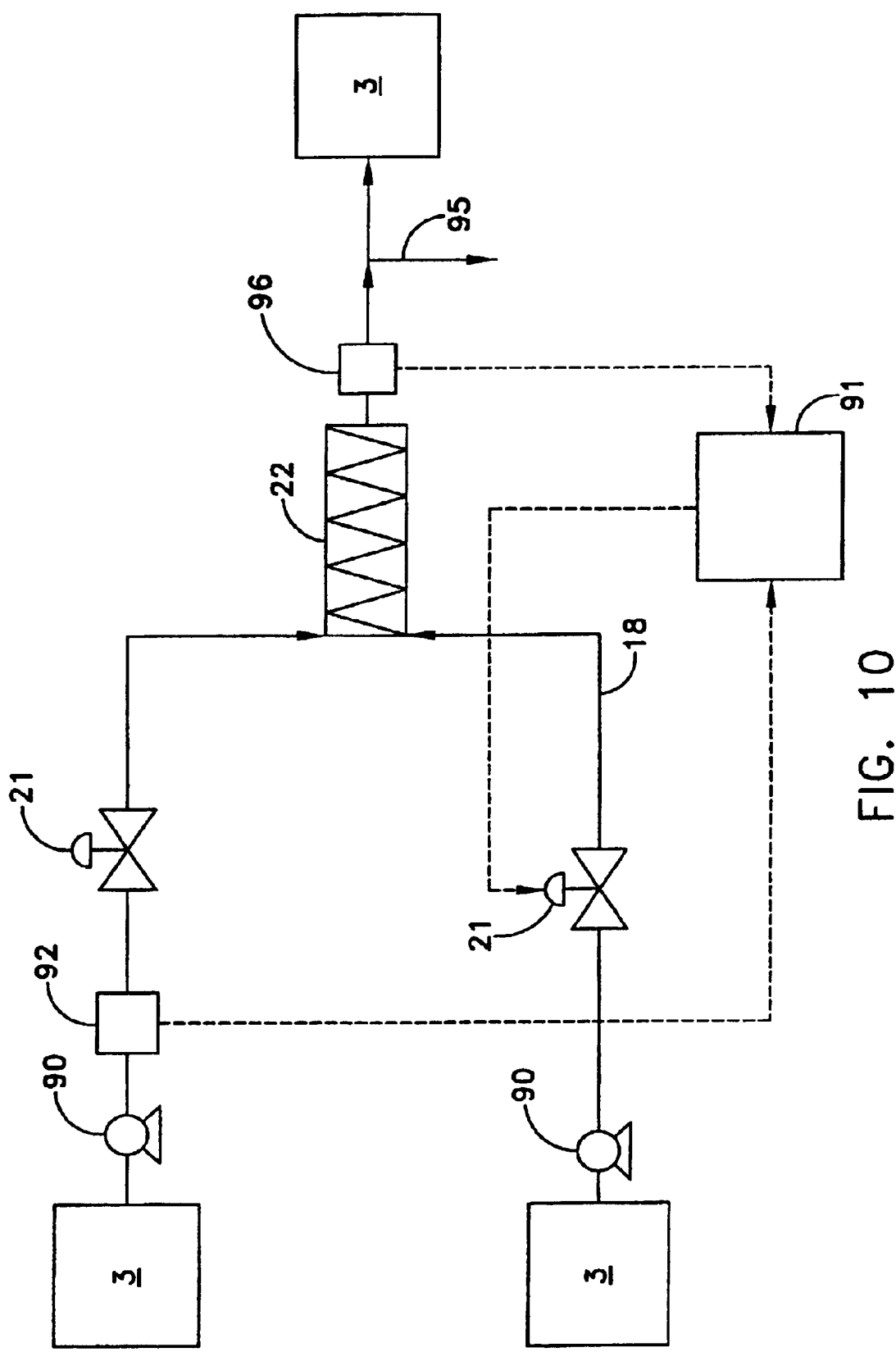
FIG. 10 is block diagram of another embodiment of the apparatus of the invention.

In an alternate embodiment, for example as illustrated in FIGS. 9 and 10, outlet line 17 may feed into a holding vessel 3 and blended process material may be fed from holding vessel 3 to points of use as needed. Storing the blended process materials in holding vessel 3 may allow the acceptability of the blended process materials to be tested before they are sent to a point of use. Instruments similar to those described above for analysis of chemical and slurry process materials may also be used to verify that the blended process materials are acceptable. The concentrations of individual process materials in a blend may also be tested independently with an appropriate device. For example, the concentrations of the various constituents may be measured with chromatography, such as gas chromatography. Storing the blended process material in holding vessel 3 may also allow simplification of the blending system, as described below.

FIG. 9 illustrates a relatively simple embodiment of the blending system of the present invention in which two materials, such as a slurry and DI water, may be blended. In this embodiment, the process materials to be blended are initially stored in holding vessels 3. Holding vessels 3 may be replaced by distribution subsystems if desired and serves to illustrate that a distribution subsystem including a recirculation line may not be required in certain embodiments. The process materials may be pumped from holding vessels 3 through material supply lines 18 to static mixer 22 by a pump 90. Valves 21 may be used to regulate the flow of each process material. To simplify the blending system, one of the process materials may be supplied at a constant volumetric flow rate. For example, one valve 21 may be left in a single position or an orifice of fixed geometry may be used to provide a constant volumetric flow rate of one of the process materials. The flow rate of the other process material may then be adjusted to provide a desired blend of process materials.

Where one of the process materials is maintained at a constant volumetric flow rate, a sensor 92 providing data allowing the volumetric flow rate to be converted to a mass flow rate may be included on material supply line 18. Sensor 92 may measure density or a property that may correlated to density, such as temperature. For example, a controller 91 may receive a signal from sensor 92 representing a density of the process material and may calculate a mass flow rate of process material based upon this signal and the known volumetric flow.

Controller 91 may also receive signals from a sensor 93 associated with the material supply line through which the volumetric flow rate varies. As with sensor 92, sensor 93 may provide a signal that represents a property that may allow the mass flow in the material supply line to be calculated based on a volumetric flow. As the volumetric flow rate of process material may vary, controller 91 may also receive a signal from a volumetric flow meter 94, allowing the mass flow rate to be calculated. Based upon the mass flow rate in the material supply line, controller 91 may control a valve 21 to provide a mass flow rate that, with the mass flow rate of process material in the other material supply line, provides a desired blend of process materials.

In an alternate embodiment, for example as illustrated in FIG. 10, sensor 93 and volumetric flow meter 94 may be eliminated by providing a sensor 96 downstream of static mixer 22 able to verify that the blended process material is acceptable. For example, where a slurry and DI water are blended, a densitometer, percent solids sensor, or the like may be used to verify that the blended process material is acceptable. Sensor 96 may provide a signal to controller 91 representing the condition of the blended process material. If necessary, controller 91 may adjust the flow rate of one of process materials with valve 21 until a signal representing a set point is achieved from sensor 96. For example, where the process materials are a slurry and DI water the density of the desired slurry/DI water blend may be the set point. If this density is detected to be too low, more slurry may be added and, if it is detected to be too high, the amount of slurry being added may be reduced. In some embodiments, several sensors 96, of different or similar types, may provide signals to the controller representing conditions of the blended process materials.

Figure 13:
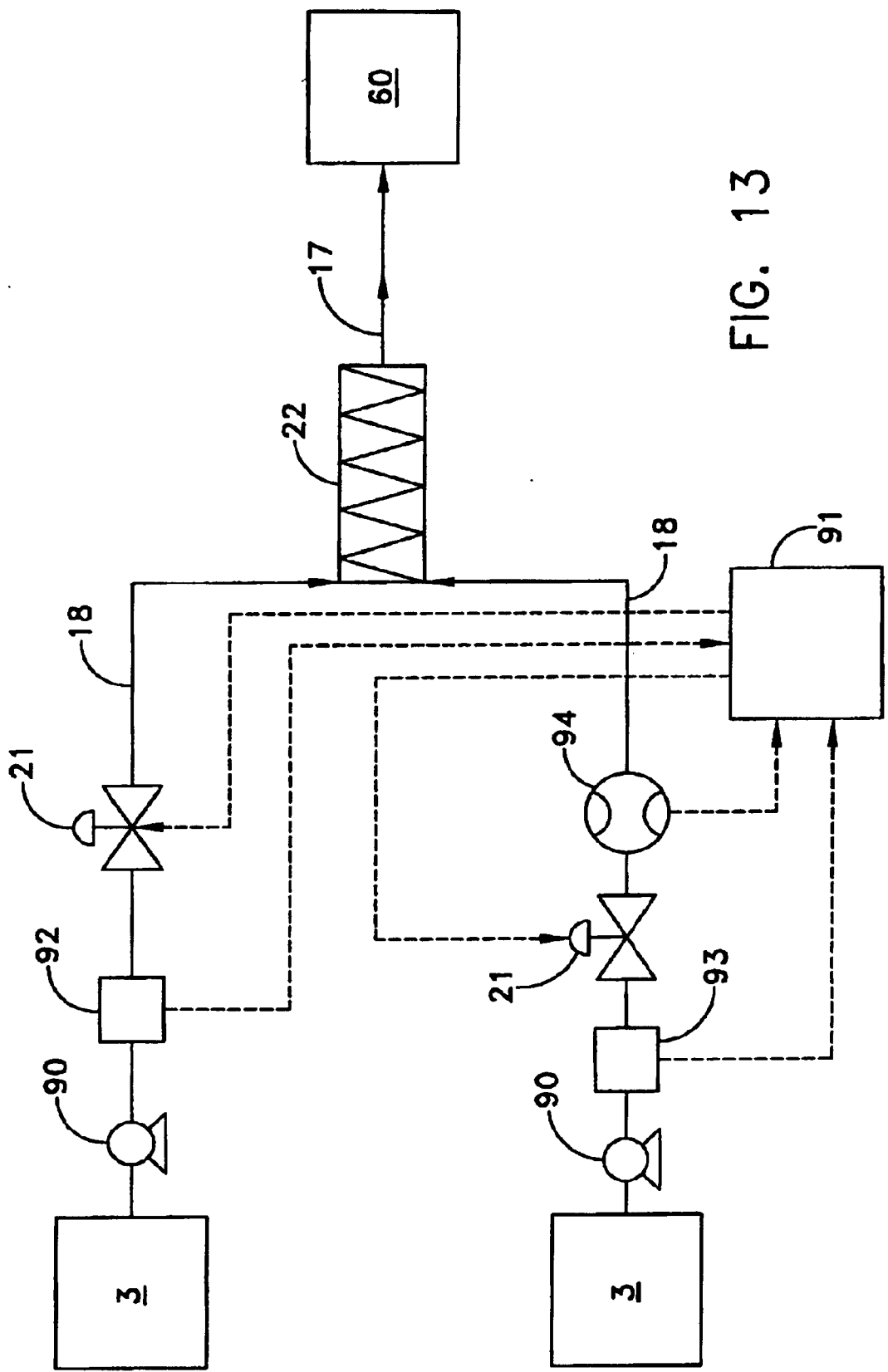
FIG. 13 is a block diagram of another embodiment of the apparatus of the invention.

In any embodiment where one of the process materials is fed at a constant flow rate and the flow rate of the other process material is adjusted to produce a desired blend, the overall flow rate is generally not selectable. Accordingly, such embodiments may provide the blended process material to a holding vessel 3. Holding vessel 3 may contain a device or system to prevent settling or separation of the blended process materials, such as an agitator. In another embodiment, excess blended process material may be produced and what is needed may be supplied on demand with the remainder being discarded. Alternatively, the flow rate of the other process material may be adjusted as well, such that the overall flow rate of the blended process materials may be matched to the demand, as described previously and shown in FIG. 13.

During start-up, or any other time that a blend of process materials may not be acceptable or needed, the blend may be diverted away from a point of use or holding vessel. For example, the unacceptable or unneeded blend of process material may be sent to a drain 95 or otherwise disposed of. A drain or other disposal system may be used in any embodiment of the present invention where the blend of process material may be unacceptable or unneeded under some circumstances.

The present invention will be further illustrated by the following examples which are intended to be illustrative in nature and not considered as limiting to the scope of the invention.

EXAMPLES

Example 1

A typical blend process includes the dilution of a high solids, concentrated silica slurry with DI water. One such commercially available slurry is the CABOT® SEMI-SPERSE™ 25 slurry, which is a colloidal suspension having 25 wt. % solids and a density range of 1.162–1.170 g/ml (1.166±0.004 g/ml). This slurry is a typical polishing slurry in wafer production used during the silica oxide layer, or oxide step, polish. For purposes of this example, the demand is assumed to be 200 milliliters per minute (ml/min) of the blended process materials.

Typical polishing processes require a blend having a slurry to DI water ratio of 1:1 by mass or about 1:1.17 by volume, resulting in a final density of about 1.074 grams per milliliter (g/ml). Variations in the slurry may result from variations in the manufacturing of the base material. Furthermore, although an incompressible fluid, the density of water used in the manufacturing of the raw slurry also varies as does the density of the DI water blended with the slurry. Density values of DI water are known and readily available from technical reference publications. One such publication, The Handbook of Chemistry and Physics from CRC Press, Inc., states a density range of 0.99970 to 0.99565 g/ml for water over a temperature range of 50° to 86° F. (10° to 30° C.). The temperature of the supply of DI water from a facility generation plant ranges typically ranges from about 65° to 75° F. (18° to 24° C.). Accordingly, for purposes of this example, the density of DI water will be assumed to be 0.99821 g/ml (its listed density at 68° F. (20° C.)), however, in practice, this temperature could be monitored to provide an accurate density.

Since the density of the two components may vary, volumetric mixing produces a higher risk of error in the blend than mass mixing. Accordingly, for a 1:1 by weight recipe, equal masses of each constituent are added resulting in about 1.00 ml of slurry concentrate and about 1.168 ml of DI water.

In a dynamic situation of recipe blending, the materials must be displaced at rates whose sum equates to 200 ml/min or 3.33 ml/sec. Using the above stated, nominal density of 1.074 g/ml and desired blend flow rate of 200 ml/min or 3.3 ml/s, a mass rate of about 1.789 g/sec is the desired final product.

Since this simple application involves equal masses of the two constituents, adjusting the flow rate of the supply streams of both slurry and water individually may control the final projected fluid stream. Ideally, both mass rates of concentrated slurry and deionized water are equal to one another and the ratio of each mass rate to the respective densities for each material yield the desired volumetric flow rate. This would generate the volumetric flow rates of about 92.064 ml/min (1.534 ml/sec) for the concentrated 25% solids slurry and about 107.928 ml/min (1.799 ml/sec) for the deionized water. Note that this application is good only for the constant density of slurry at 1.166 g/ml stated above. As the actual density of the material may fluctuate, the communication of this value from the dispensing subsystem to the controller may adjust the flow controllers accordingly. For example, if the value of the density increased to 1.180 g/ml, the controller may regulate the flow rate by closing the valve to the appropriate degree. This in turn would decrease the absolute output flow rate, which in turn would be adjusted by increasing the deionized water flow rate. The specified endpoint flow rate and density would be substantially constant during these adjustments.

Example 2

In order to demonstrate that the blending system of the present invention could produce acceptable blends of process material, the hypothetical blend of slurry and DI water described in Example 1 was performed using the blending system illustrated in FIG. 9. DI water was supplied from a holding vessel at a constant, known volumetric flow rate and its temperature was monitored and supplied to a controller that calculated a mass flow rate of the DI water. The slurry described in Example 1 was supplied from a second holding vessel. This slurry was tested and found to have a percent solids of 25.8 wt. % and a density of 1.151 g/ml. The density of the slurry and its volumetric flow rate were monitored and provided to a controller to calculate a mass flow rate of slurry. The slurry mass flow rate was adjusted with a valve by the controller to produce about a 1:1 mass ratio of DI water to slurry.

Figure 11:
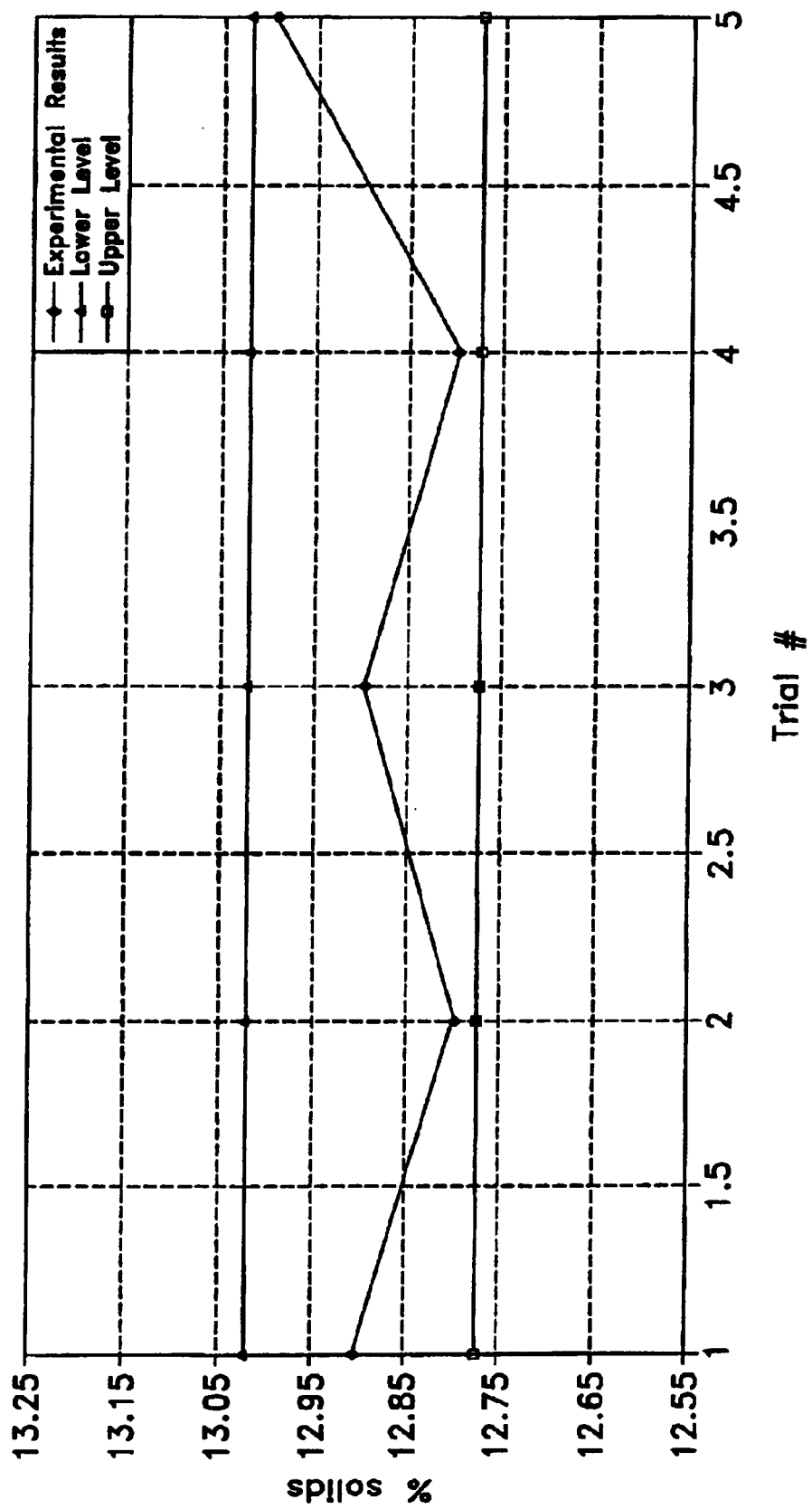
FIG. 11 is a graph of percent solids versus trial number.
Figure 12:
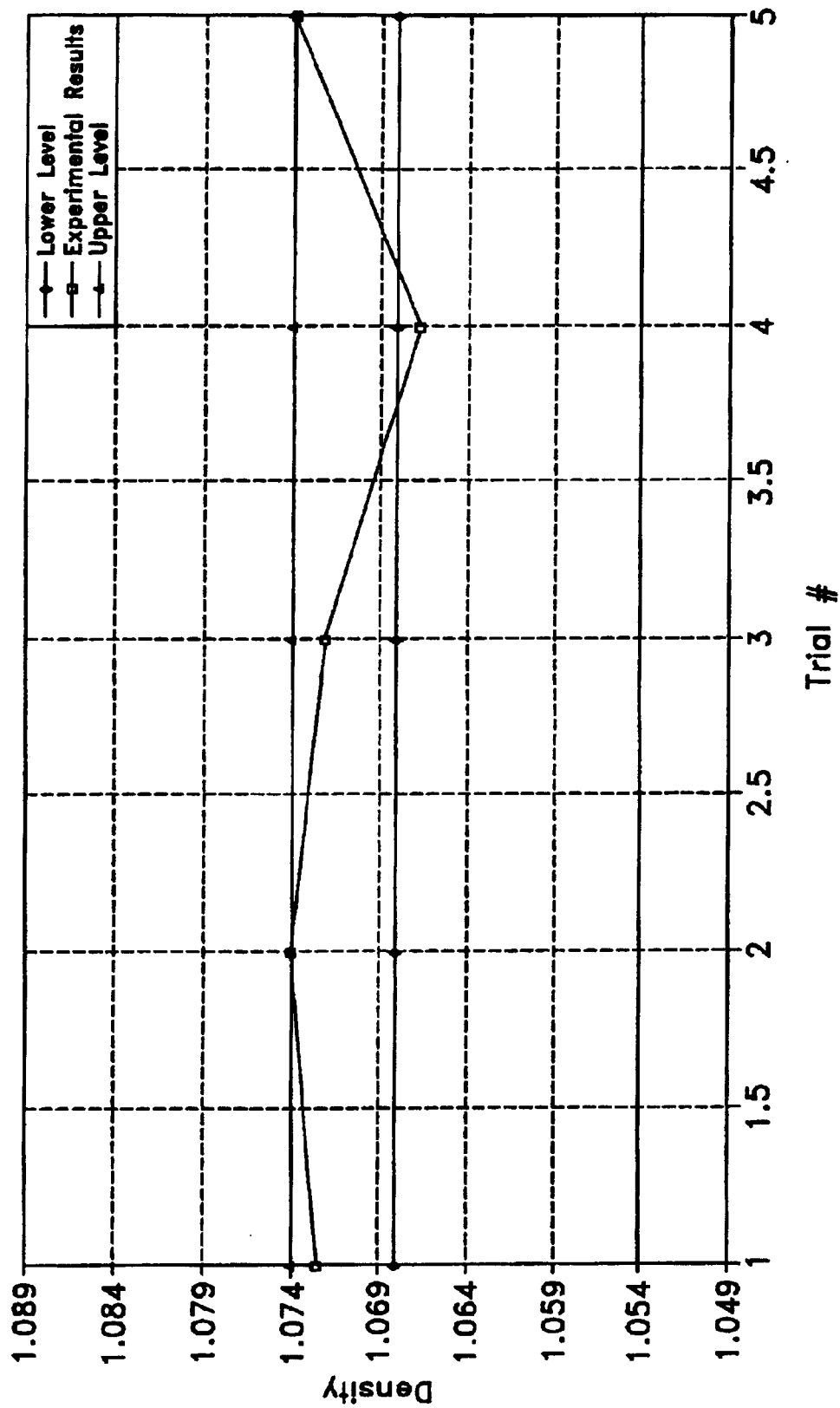
FIG. 12 is a graph of density versus trial number.

Based on typical error tolerances for the semiconductor industry, a range of acceptable percent solids and density were defined as illustrated by the upper and lower levels in FIGS. 11 and 12. These figures also report the percent solids and density, respectively, for each of five trials. In all cases the percent solids were acceptable and in all cases but one the density was acceptable. This demonstrates that the blending system of the present invention can repeatably produce acceptable blends of process materials.

It will be understood that each of the elements described herein, or two or more together, may be modified or may also find utility in other applications differing from those described above. While particular embodiments of the invention have been illustrated and described, it is not intended to be limited to the details shown, since various modifications and substitutions may be made without departing in any way from the spirit of the present invention as defined by the following claims.

What is claimed is:

1. A blending system, comprising:
   a first material supply line to provide a first material;
   a second material supply line to provide a second material;
   a mixer fluidly connected downstream of the first and the second material supply lines to provide a blend of the first and second materials, the blend having a predetermined composition of the first and second materials and a predetermined flow rate; and
   a process control system comprising a first flow control device positioned on the first material supply line; a second flow control device positioned on the second material supply line; a first sensor positioned on the first material supply line to provide a first sensor signal indicative of a concentration of the first material; a second sensor positioned on the second material supply line to provide a second sensor signal indicative of a concentration of the second material; and a controller, responsive to the first and second sensor signals, to provide a respective control signal to each of the first and the second flow control devices that respectively adjusts a flow rate of the first material and a flow rate of the second material to maintain the predetermined flow rate of the blend of the first and second materials having the predetermined composition in response to variations in the concentration of at least one of the first and second materials.

2. The blending system of claim 1, wherein the first sensor is a density sensor.

3. The blending system of claim 1, wherein the mixer is a static mixer.

4. The blending system of claim 1, further comprising:
   a third material supply line to provide a third material, the third material line being fluidly connected upstream of the mixer, the mixer providing a blend of the first, second, and third materials having a predetermined composition of the first, second, and third materials at the predetermined flow rate;
   wherein the process control system further includes:
   a third flow control device positioned on the third material supply line fluidly connected upstream of the mixer; and
   a third sensor positioned on the third material supply line;
   wherein the respective control signal provided to the first flow control device is further based upon the third sensor signal, the respective control signal provided to the second flow control device is further based upon the third sensor signal, and wherein the controller further provides a control signal to the third flow control device based upon the first, second, and third sensor signals, wherein the control signals provided to the first, second, and third flow control devices respectively adjusts the flow rate of the first material, the flow rate of the second material, and a flow rate of the third material to maintain the predetermined flow rate of the blend of the first, second and third materials having the predetermined composition in response to variations in the concentration of at least one of the first, second, and third materials.

5. The blending system of any of claim 1 or 2, wherein the second sensor is a density sensor.

6. A method of supplying blended process materials, comprising acts of:
   supplying a first process material;
   supplying a second process material;
   blending the first and the second process materials to produce a blend having a predetermined composition of the first and second process materials;
   sensing a first parameter of the first material to provide a first sensor signal indicative of a concentration of the first process material;
   sensing a second parameter of the second material to provide a second sensor signal indicative of a concentration of the second process material;
   regulating the supply of each of the first and second process materials based upon the first and second sensor signals; and
   maintaining, responsive to variations in the concentration in at least one of the first and second process materials, a substantially constant flow rate of the blend of the first and second Process materials having the predetermined composition.

7. The method of claim 6, further comprising:
   supplying a third process material; and
   sensing a third parameter of the third process material to provide a third sensor signal,
   wherein the act of blending includes blending the first, second, and third process materials to produce a blend having a predetermined composition of the first, second and third process materials; and
   wherein the act of regulating includes regulating the supply of each of the first, second, and third process materials based upon the first, second and third sensor signals.

8. A blending system to provide a blend having a predetermined composition of a first material and a second material, comprising:
   a first material supply line to provide the first material;
   a second material supply line to provide the second material;
   a mixer fluidly connected downstream of the first and second material supply lines to produce a blend of the first and second materials, the blend having the predetermined composition; and
   means, responsive to changes in concentration of at least one of the first and second materials, for adjusting an amount of the first and second materials provided to the mixer to maintain a substantially constant flow rate of the blend of the first and second materials having the predetermined composition.

9. The blending system of claim 8, wherein the mixer is a static mixer.

* * * * *